US008750861B2

(12) United States Patent
Kondo

(10) Patent No.: US 8,750,861 B2
(45) Date of Patent: Jun. 10, 2014

(54) CONTROL APPARATUS, MOBILE COMMUNICATION SYSTEM, RADIO COMMUNICATION CONTROL METHOD, AND COMPUTER READABLE MEDIUM

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/521,583

(22) PCT Filed: Dec. 3, 2010

(86) PCT No.: PCT/JP2010/007052
§ 371 (c)(1),
(2), (4) Date: Jul. 11, 2012

(87) PCT Pub. No.: WO2011/089671
PCT Pub. Date: Jul. 28, 2011

(65) Prior Publication Data
US 2013/0040650 A1   Feb. 14, 2013

(30) Foreign Application Priority Data

Jan. 22, 2010 (JP) ................................. 2010-011857

(51) Int. Cl.
*H04W 24/00* (2009.01)

(52) U.S. Cl.
USPC ............ 455/423; 370/252; 455/424; 455/425

(58) Field of Classification Search
USPC ........................ 370/252; 455/423, 424, 425
See application file for complete search history.

(56) References Cited

U.S. PATENT DOCUMENTS

| 6,118,981 A * | 9/2000 | Ohmori ..................... 455/426.2 |
| 6,470,057 B1 * | 10/2002 | Hui et al. ..................... 375/294 |
| 2008/0147370 A1 | 6/2008 | Sjerling |
| 2011/0051609 A1 * | 3/2011 | Ishii et al. ..................... 370/252 |

FOREIGN PATENT DOCUMENTS

| JP | 09-116487 A | 5/1997 |
| JP | 10-145278 A | 5/1998 |
| JP | 2000-083036 A | 3/2000 |

(Continued)

OTHER PUBLICATIONS

3GPP TS 25.322, "3rd Generation Partnership Project; Technical Specification Group Radio Access Network; Radio Link Control (RLC) Protocol Specification", (Release 8), (Sep. 2009), pp. 1-4, V8.6.0.

(Continued)

*Primary Examiner* — Charles Appiah
*Assistant Examiner* — Jaime Holliday
(74) *Attorney, Agent, or Firm* — Sugrue Mion, PLLC

(57) ABSTRACT

A control apparatus (e.g., a radio base station) for controlling radio communication includes a communication unit for transferring data, an RLC processor for performing radio link control, an RLC parameter adaptive controller for setting a parameter to be used for the radio link control, a broadcast information generator for generating broadcast information including the parameter, and a pseudo incoming call controller for performing pseudo incoming call to a communication terminal (e.g., a mobile terminal) for a plurality of times after the broadcast information is broadcasted to the communication terminal through the communication unit, to measure a success rate of the pseudo incoming calls using responses to the pseudo incoming calls. The RLC parameter adaptive controller updates the parameter according to the success rate measured by the pseudo incoming call controller.

12 Claims, 7 Drawing Sheets

(56) References Cited

FOREIGN PATENT DOCUMENTS

| JP | 2008-530899 A | 8/2008 |
|---|---|---|
| JP | 2008-295070 A | 12/2008 |
| JP | 2009-055356 A | 3/2009 |

OTHER PUBLICATIONS

International Search Report of PCT/JP2010/007052 dated Jan. 11, 2011.

* cited by examiner

CONTROL APPARATUS, MOBILE COMMUNICATION SYSTEM, RADIO COMMUNICATION CONTROL METHOD, AND COMPUTER READABLE MEDIUM

CROSS REFERENCE TO RELATED APPLICATIONS

This application is a National Stage of International Application No. PCT/JP2010/007052 filed Dec. 3, 2010, claiming priority based on Japanese Patent Application No. 2010-011857 filed Jan. 22, 2010, the contents of all of which are incorporated herein by reference in their entirety.

TECHNICAL FIELD

The present invention relates to a control apparatus for controlling a radio link of a mobile communication system, and more specifically, to setting of parameters used for radio link control.

BACKGROUND ART

In a mobile communication system, parameters used for radio link control are required to be set when radio base stations are installed. With reference to FIG. 7, the mobile communication system for setting parameters in a radio base station will be described.

In FIG. 7, a radio base station 910 includes a radio receiver 911, a radio transmitter 912, a station data unit 913, a broadcast information generator 914, an RLC processor 915, and a MAC processor 916. A mobile terminal 920 includes a radio receiver 921, a radio transmitter 922, a MAC processor 923, an RLC processor 924, and a broadcast information receiver 925.

The station data unit 913 of the radio base station 910 holds an RLC parameter value that is set in advance.

The broadcast information generator 914 of the radio base station 910 acquires the RLC parameter value from the station data unit 913, and broadcasts the RLC parameter value to the mobile terminal 920.

The RLC processor 915 of the radio base station 910 acquires the RLC parameter from the station data unit 913, to perform the radio link control.

The media access control (MAC) processor 916 of the radio base station 910 performs allocation control and the like of radio resources.

The radio transmitter 912 of the radio base station 910 transmits the transmission data received from the MAC processor 916 to the mobile terminal 920.

The radio receiver 911 of the radio base station 910 passes the reception data to the MAC processor 916 to the mobile terminal 920.

The radio receiver 921 of the mobile terminal 920 passes the data received from the radio base station 910 to a MAC processor 926.

The radio transmitter 922 of the mobile terminal 920 transmits the data received from the MAC processor 916 to the radio base station 910.

The MAC processor 923 of the mobile terminal 920 performs allocation control and the like of radio resources.

The RLC processor 924 of the mobile terminal 920 performs radio link control.

The broadcast information receiver 925 of the mobile terminal 920 updates the RLC parameter with the RLC parameter value instructed from the received broadcast information.

Further, a patent literature 1 discloses an adaptive radio parameter control method of adaptively setting a radio parameter when each packet is transmitted by radio according to the service quality (Quality of Service: QoS) required for each packet to be transmitted.

CITATION LIST

Patent Literature

PTL1: Japanese Unexamined Patent Application Publication No. 2008-295070

SUMMARY OF INVENTION

Technical Problem

However, in the related radio system, the RLC parameter executes a field test for each radio base station, change parameters with human intervention, executes an incoming call test, to find out the RLC parameter which increases the incoming call success rate. Accordingly, high cost and considerable time are required. Further, it is difficult to use the technique disclosed in the patent literature 1 for means for setting parameters with high incoming call success rate when the radio base station is installed.

One exemplary object of the present invention is to provide a control apparatus and a method of performing change of RLC parameters and an incoming call test.

Solution to Problem

An exemplary aspect of a control apparatus (e.g., radio base station, base station control station or the like) according to the present invention is a control apparatus for controlling radio communication, and includes a communication unit for transferring data, a radio link controller for performing radio link control, a parameter controller, a broadcast information generator, and a pseudo incoming call controller. The parameter controller sets a parameter to be used for the radio link control. The broadcast information generator generates broadcast information including the parameter. The pseudo incoming call controller performs pseudo incoming call to a communication terminal for a plurality of times after the broadcast information is broadcasted to the communication terminal through the communication unit, to measure a success rate of the pseudo incoming calls using responses to the pseudo incoming calls. Further, the parameter controller updates the parameter according to the success rate measured by the pseudo incoming call controller.

Further, an exemplary aspect of a mobile communication system according to the present invention is a mobile communication system in which a control apparatus controls radio communication of a communication terminal. As described above, the control apparatus includes a communication unit, a radio link controller, a parameter controller, a broadcast information generator, and a pseudo incoming call controller. Further, the communication terminal includes a broadcast information receiver for updating a parameter value in the communication terminal using the parameter included in the broadcast information, a terminal radio receiver for receiving the pseudo incoming calls, and a terminal radio transmitter for transmitting responses to the pseudo incoming calls.

Further, an exemplary aspect of a radio communication control method according to the present invention is a method of controlling radio communication for setting a parameter to be used for radio link control by a control apparatus of a mobile communication system, the method including: setting the parameter; generating broadcast information including the parameter; broadcasting the broadcast information to a communication terminal through a communication unit; performing pseudo incoming call to the communication terminal for a plurality of times; measuring a success rate of the pseudo incoming calls according to responses from the communication terminal; and updating the parameter according to the success rate that is measured.

An exemplary aspect of a non-transitory computer readable medium according to the present invention stores a program for achieving a radio communication control method of setting a parameter to be used for radio link control by a control apparatus of a mobile communication system. The program causes a computer to execute the following procedures of: (1) a parameter control procedure for setting the parameter; (2) a broadcast information generation procedure for generating broadcast information including the parameter; (3) a pseudo incoming call control procedure for performing pseudo incoming call to a communication terminal for a plurality of times after the broadcast information is broadcasted to the communication terminal through the communication unit, to measure a success rate of the pseudo incoming calls using responses to the pseudo incoming calls; and (4) a parameter update procedure for updating the parameter according to the success rate that is measured.

Advantageous Effects of Invention

According to the present invention, it is possible to provide a control apparatus and a method of performing change of RLC parameters and an incoming call test when the radio base station is installed, for example.

DESCRIPTION OF EMBODIMENTS

Hereinafter, exemplary embodiments of the present invention will be described with reference to the drawings. For the sake of clarification of description, the following description and the drawings are partially omitted and simplified as appropriate. Throughout the drawings, the components and the corresponding parts having the same configurations or features are denoted by the same reference symbols, and description thereof will be omitted.

The present invention determines an appropriate value of a radio link control (RLC) parameter (also simply referred to as a "parameter") which is required to be finely adjusted or set in order to construct the radio system as a self organized network (SON) in a mobile communication system according to the radio environment. The mobile communication system uses a radio communication line, and employs, for example, an adaptive RLC retransmission radio system. The mobile communication system includes, for example, a control apparatus for controlling radio communication. More specifically, the mobile communication system includes a radio base station, and a base station control station for controlling the radio base station. The radio base station is an apparatus for sending or receiving radio waves to secure communication lines with mobile terminals, and includes a femto base station. The base station control station is an apparatus for controlling the radio base station. When the control apparatus is installed, the RLC parameter described above is required to be set. The RLC parameter includes, for example, an RLC maximum retransmission number (also simply referred to as a "maximum retransmission number"), and an RLC response timer value (also simply referred to as a "response timer value").

First Exemplary Embodiment

In a first exemplary embodiment, an exemplary aspect for achieving a control apparatus of the present invention by a radio base station will be described.

Figure 1:
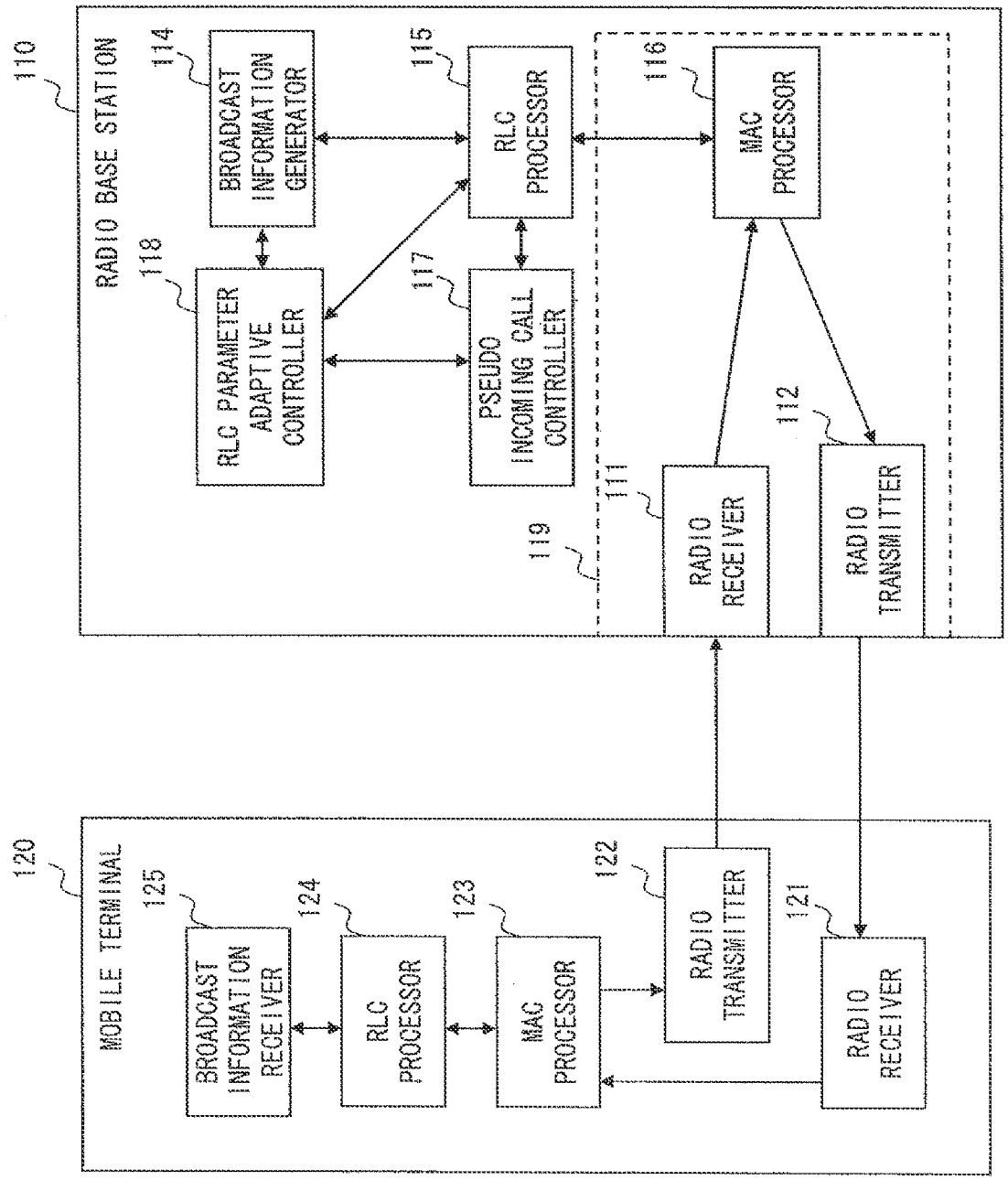
FIG. 1 is a block diagram showing a configuration example of a mobile communication system according to a first exemplary embodiment of the present invention.

FIG. 1 is a block diagram showing a configuration example of a mobile communication system according to the first exemplary embodiment of the present invention. In FIG. 1, the mobile communication system is a system for providing a radio communication line, and includes a radio base station 110 and a mobile terminal 120. The radio base station 110 includes a radio receiver 111, a radio transmitter 112, a broadcast information generator 114, an RLC processor (radio link controller) 115, a MAC processor 116, a pseudo incoming call controller 117, and an RLC parameter adaptive controller (parameter controller) 118. The mobile terminal 120 includes a radio receiver 121, a radio transmitter 122, a MAC processor 123, an RLC processor 124, and a broadcast information receiver 125.

The mobile terminal 120 is not necessarily a terminal which can be moved, but may be a communication terminal for performing communication using a radio communication line provided by the mobile communication system. Further, when the mobile terminal 120 includes the components whose names are the same to those included in the radio base station 110, the word "terminal" may be added to the name of the component in order to differentiate these terms. For example, the "radio receiver" is denoted by the term "terminal radio receiver" in order to differentiate these two terms.

The RLC processor 115 of the radio base station 110 performs radio link control.

The MAC processor 116 of the radio base station 110 performs allocation control and the like of radio resources.

The radio transmitter 112 of the radio base station 110 transmits transmission data received from the MAC processor 116 to the mobile terminal 120.

The radio receiver 111 of the radio base station 110 passes reception data to the MAC processor 116 to the mobile terminal 120.

Note that each of the radio receiver 111, the radio transmitter 112, and the MAC processor 116 may be referred to as a communication unit 119. The communication unit 119 has a function of transferring data. More specifically, the communication unit 119 achieves data transfer with the mobile terminal 120.

The radio receiver 121 of the mobile terminal 120 passes data received from the radio base station 110 to the MAC processor 123.

The radio transmitter 122 of the mobile terminal 120 transmits data received from the MAC processor 123 to the radio base station 110.

The MAC processor 123 of the mobile terminal 120 performs allocation control and the like of radio resources.

The RLC processor 124 of the mobile terminal 120 performs radio link control.

While not being shown in the drawings, also in the mobile terminal 120 as well as the radio base station 110, each of the radio receiver 121, the radio transmitter 122, and the MAC processor 123 may be referred to as a terminal communication unit.

The pseudo incoming call controller 117 of the radio base station 110 performs pseudo incoming call processing on the mobile terminal 120 to measure the success rate of the pseudo incoming call and sends the result to the RLC parameter adaptive controller 118.

The RLC parameter adaptive controller 118 of the radio base station 110 sets RLC parameters used for radio link control. Specifically, the RLC parameter adaptive controller 118 first instructs the broadcast information generator 114 to change the RLC response timer value and the RLC maximum retransmission number which are RLC parameters regarding the uplink, and instructs the RLC controller to change them regarding the downlink. Next, the RLC parameter adaptive controller 118 causes the pseudo incoming call controller 117 to measure the success rate of the pseudo incoming call, to obtain parameter values with high success rate. Then, the RLC parameter adaptive controller 118 instructs the broadcast information generator 114 regarding the uplink, and instructs the RLC controller regarding the downlink.

The broadcast information generator 114 of the radio base station 110 updates the broadcast information with the RLC parameters instructed by the RLC parameter adaptive controller 118, and broadcasts the broadcast information to the mobile terminal 120 through the radio base station 110.

The broadcast information receiver 125 of the mobile terminal 120 updates the RLC parameters with the RLC parameter values instructed by the received broadcast information.

Next, an operation in which the mobile communication system sets the RLC parameter (parameter control processing) will be described. The outline of the parameter control processing is as follows: (A) setting any desired RLC parameter to execute pseudo incoming call for a plurality of times using the RLC parameter that is set; (B) measuring the response rate using the incoming call responses to the pseudo incoming calls; (C) changing the RLC parameter to be set to repeat the pseudo incoming call, to measure the response rate according to different parameters; and (D) detecting the appropriate RLC parameter according to the response rate to set (update) the RLC parameter. The description will be made hereinafter in detail with reference to the drawings.

Figure 2:
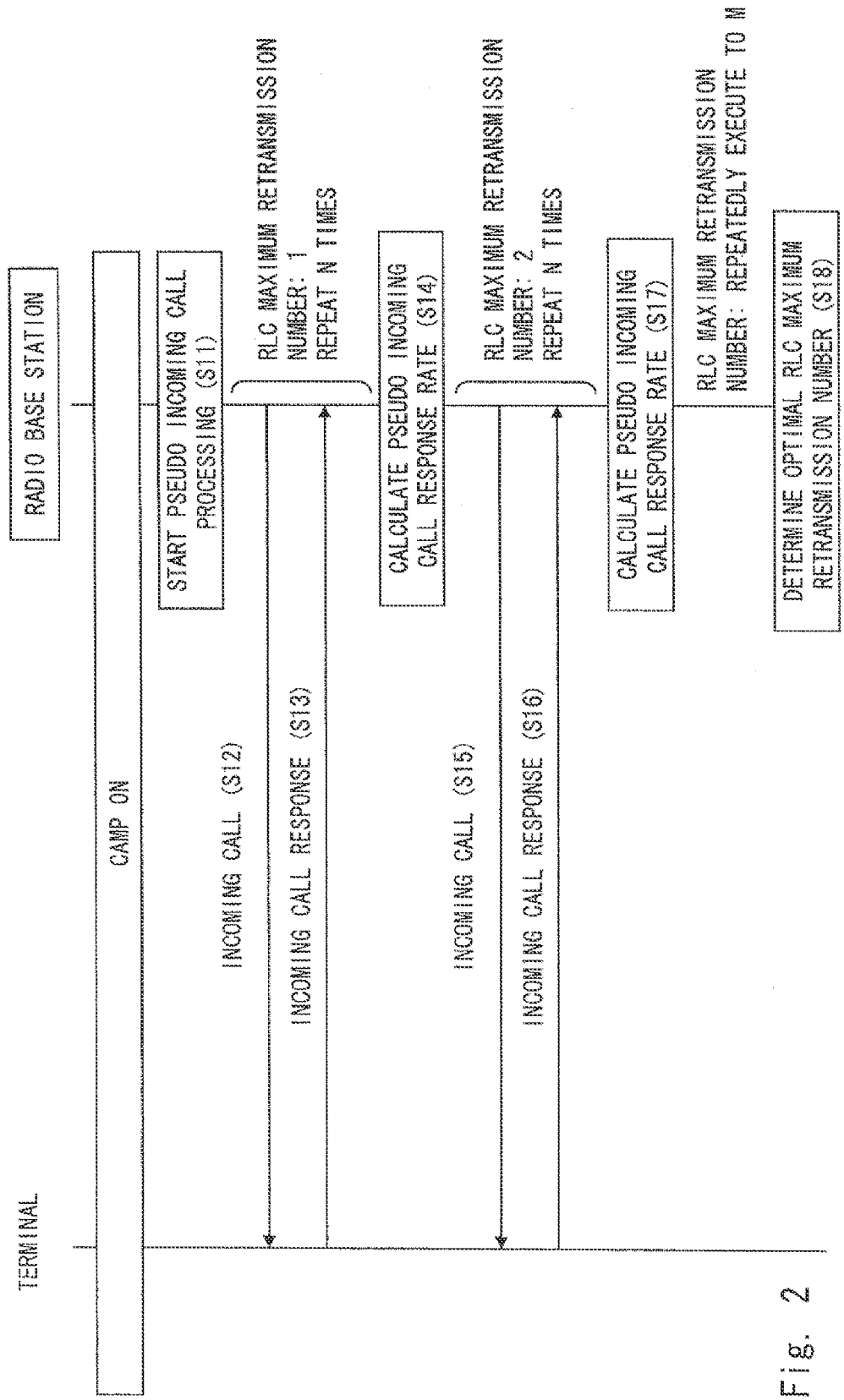
FIG. 2 is a timing chart showing an operation example for obtaining an RLC maximum retransmission number according to the first exemplary embodiment.

FIG. 2 is a timing chart showing an operation example for obtaining the RLC maximum retransmission number according to the first exemplary embodiment. With reference to FIG. 2, an operation will be described in which the radio base station 110 performs pseudo incoming call on the terminal which camps on the mobile communication system shown in FIG. 1 to obtain the optimal RLC maximum retransmission number.

When the radio base station 110 is installed, in a state in which the mobile terminal 120 camps on the control area of the radio base station 110, the radio base station 110 starts parameter control processing (maximum retransmission number determination processing) (S11).

When the parameter control processing is started, the RLC parameter adaptive controller 118 sets the RLC maximum retransmission number to 1, and notifies the RLC maximum retransmission number to the RLC processor 115 of the radio base station 110. Further, the RLC parameter adaptive controller 118 notifies the broadcast information generator 114 of the RLC maximum retransmission number that is set. The broadcast information generator 114 updates the broadcast information, and the radio base station 110 transmits the broadcast information to the mobile terminal 120 through the RLC processor 115, the MAC processor 116, and the radio transmitter 112.

The mobile terminal 120 receives the broadcast information by the broadcast information receiver 125, to set the broadcast information in the RLC processor 124 of the mobile terminal 120.

The pseudo incoming call controller 117 of the radio base station 110 transmits the pseudo incoming call to the terminal (S12).

Upon receiving the pseudo incoming call, the mobile terminal 120 sends back the incoming call response to the radio base station 110 (S13).

The pseudo incoming call controller 117 of the radio base station 110 repeats the pseudo incoming call N (N is any number of 1 or larger) times, to measure the pseudo incoming call response rate (S14).

Next, the RLC parameter adaptive controller 118 sets the RLC maximum retransmission number to 2, and notifies the RLC maximum retransmission number to the RLC processor 115 of the radio base station 110. Further, the RLC parameter adaptive controller 118 notifies the broadcast information generator 114 of the RLC maximum retransmission number that is set. The broadcast information generator 114 updates the broadcast information, and the radio base station 110 transmits the broadcast information to the mobile terminal 120.

The mobile terminal 120 receives the broadcast information by the broadcast information receiver 125, to set the broadcast information in the RLC processor 124 of the mobile terminal 120.

The pseudo incoming call controller 117 of the radio base station 110 transmits the pseudo incoming call to the terminal (S15).

Upon receiving the pseudo incoming call, the mobile terminal 120 sends back the incoming call response to the radio base station 110 (S16).

The pseudo incoming call controller 117 of the radio base station 110 repeats the pseudo transmission N times, to measure the pseudo incoming call response rate (S17).

In this way, the radio base station 110 adds one to the RLC maximum retransmission number, and repeatedly executes update of the RLC maximum retransmission number and calculation of the pseudo response rate until when the RLC maximum retransmission number reaches M (M is any number of one or larger). The RLC parameter adaptive controller 118 obtains the minimum RLC maximum retransmission number with high pseudo incoming call response rate to determine the RLC maximum retransmission number (S18). Described here is an example in which the RLC parameter adaptive controller 118 adds one to the RLC maximum retransmission number. However, an integer value other than one may be added.

Figure 3:
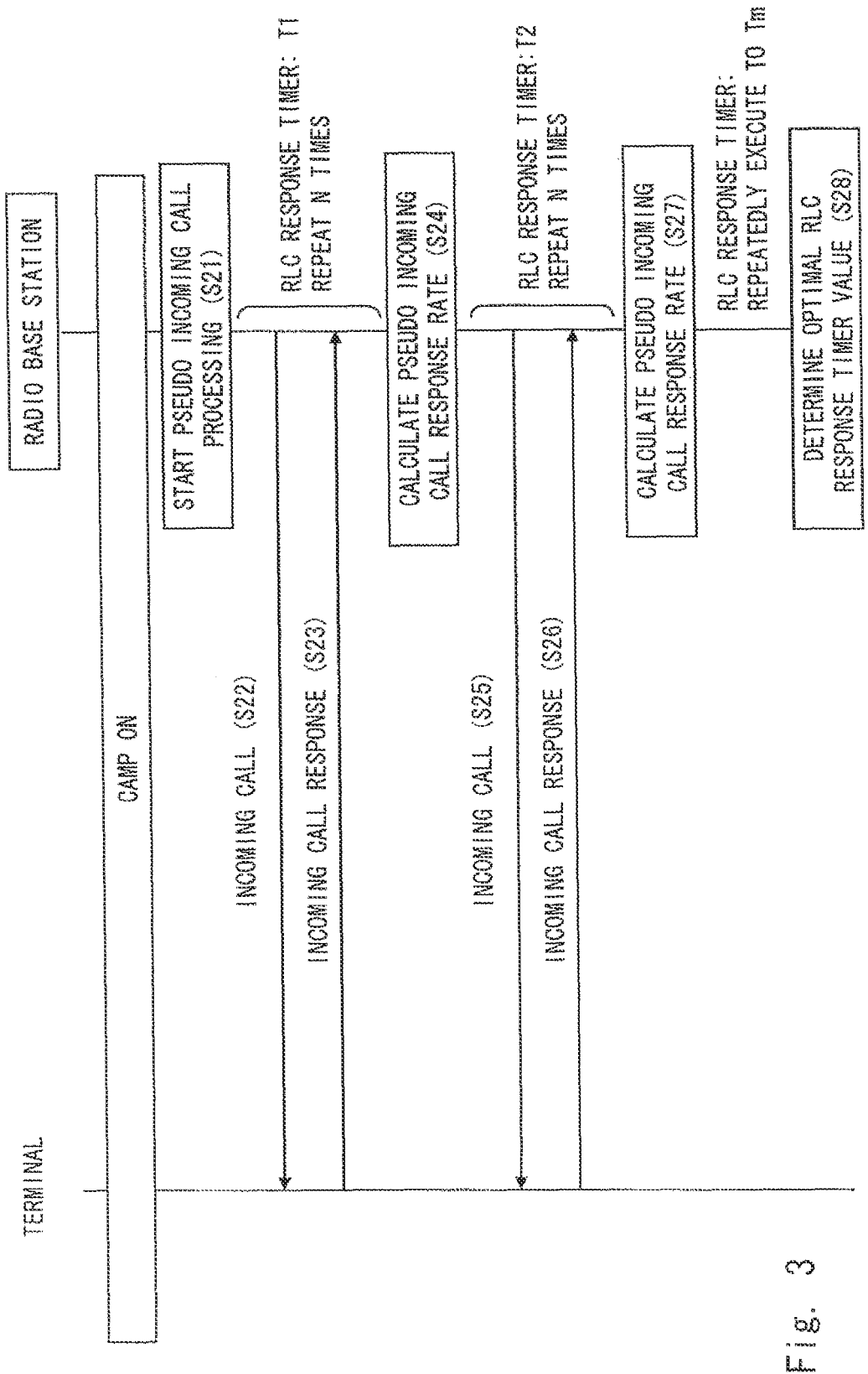
FIG. 3 is a timing chart showing an operation example for obtaining an RLC response timer value according to the first exemplary embodiment.

FIG. 3 is a timing chart showing an operation example for obtaining the RLC response timer value according to the first exemplary embodiment. With reference to FIG. 3, an operation will be described in which the radio base station 110 performs pseudo incoming call on the terminal which camps on the mobile communication system shown in FIG. 1 to obtain the optimal RLC response timer value.

The radio base station 110 starts parameter control processing (response timer value determination processing) in a state in which the mobile terminal 120 camps on the control area of the radio base station 110 when the radio base station 110 is installed (S21).

When the parameter control processing is started, the RLC parameter adaptive controller 118 sets the RLC response timer to T1, to notify the RLC response timer value that is set to the RLC processor 115 of the radio base station 110. Further, the RLC parameter adaptive controller 118 notifies the broadcast information generator 114 of the RLC response timer value that is set. The broadcast information generator 114 updates the broadcast information, and the radio base station 110 transmits the broadcast information to the mobile terminal 120 through the RLC processor 115, the MAC processor 116, and the radio transmitter 112.

The mobile terminal 120 receives the broadcast information by the broadcast information receiver 125, to set the broadcast information in the RLC processor 124 of the mobile terminal 120.

The pseudo incoming call controller 117 of the radio base station 110 transmits the pseudo incoming call to the terminal (S22).

Upon receiving the pseudo incoming call, the mobile terminal 120 sends back the incoming call response to the radio base station 110 (S23).

The pseudo incoming call controller 117 of the radio base station 110 repeats the pseudo incoming call N times to measure the pseudo incoming call response rate (S24). Note that N may be the same to or different from that in the parameter control processing described with reference to FIG. 2.

Next, the RLC parameter adaptive controller 118 sets the RLC response timer to T2, and notifies the RLC response timer value that is set to the RLC processor 115 of the radio base station 110. Further, the RLC parameter adaptive controller 118 notifies the broadcast information generator 114 the RLC response timer value that is set. The broadcast information generator 114 updates the broadcast information, and the radio base station 110 transmits the broadcast information to the mobile terminal 120.

The mobile terminal 120 receives the broadcast information by the broadcast information receiver 125, to set the broadcast information in the RLC processor 124 of the mobile terminal 120.

The pseudo incoming call controller 117 of the radio base station 110 transmits the pseudo incoming call to the terminal (S25).

Upon receiving the pseudo incoming call, the mobile terminal 120 sends back the incoming call response to the radio base station 110 (S26).

The pseudo incoming call controller 117 of the radio base station 110 repeats the pseudo transmission N times, to measure the pseudo incoming call response rate (S27).

In this way, the radio base station 110 updates the RLC response timer from T1 to Tm (m is any number of 1 or larger), and repeatedly executes update of the RLC response timer value and calculation of the pseudo response rate until when the RLC response timer reaches Tm. It is assumed here that T1 to Tm denote RLC response timer values, and the radio base station 110 uses m pieces of RLC response timer values from T1 to Tm.

The RLC parameter adaptive controller 118 obtains the minimum RLC response timer value with high pseudo incoming call response rate, to determine the RLC response timer value (S28).

The RLC parameter adaptive controller 118 may hold an initial value of the parameter (e.g., maximum retransmission number) set in the parameter control processing in a recording area of its own device in advance, and add the initial value by one to be used. Alternatively, the RLC parameter adaptive controller 118 may hold M different parameters in the storage area. Further alternatively, the RLC parameter adaptive controller 118 may hold a numerical value to be added to the initial value. Alternatively, the RLC parameter adaptive controller 118 may hold m candidate values of the parameter (e.g., response timer value) to be set in the parameter control processing in the recording area of its own device in advance, to use parameters that are held in series.

Further, the RLC parameter adaptive controller 118 may obtain information to be used to measure the response rate of the pseudo incoming call including the initial value, the numerical value to be added, and M which is the number of times that different parameters are used (the number of types of different parameters) from outside. A method of obtaining them from outside may include a method of providing a user (administrator) with an interface (e.g., input display) to let the user to input the information through the interface, a method of inputting information to be selected from a plurality of candidate values, or a method of receiving information input by a user using an interface or the like via a communication line. The method is not limited to these methods. The RLC parameter adaptive controller 118 may acquire information to be used as a candidate value of the RLC parameter.

As described above, the first exemplary embodiment achieves the effects as follows.

The first effect is that, since the RLC maximum retransmission number and the RLC response timer value are automatically determined according to the radio environment, it is possible to automatically set the values according to the wavelength of the stationary wave in the radio environment where there are various stationary waves.

The second effect is that, since the RLC parameter which is required to be adjusted is automatically set for each radio base station 110, there is no need for a maintenance person to perform adjustment by performing site measurement for each radio base station 110.

Second Exemplary Embodiment

Figure 4:
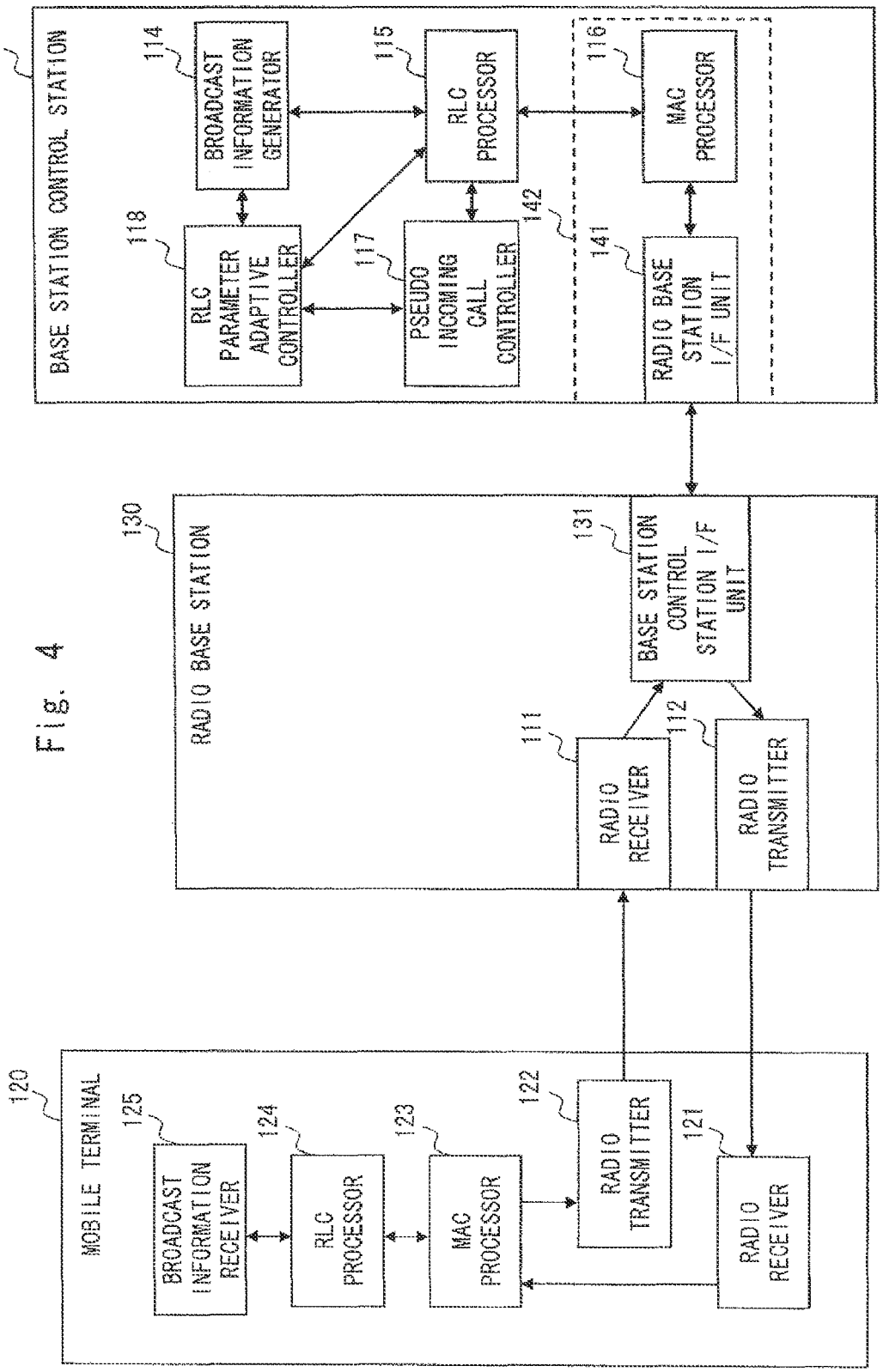
FIG. 4 is a block diagram showing a configuration example of a mobile communication system according to a second exemplary embodiment of the present invention.

The basic configuration of a second exemplary embodiment is similar to that shown in FIG. 1. Described here is an exemplary aspect in which the radio base station 110 shown in FIG. 1 includes a radio base station 130 and a base station control station 140. FIG. 4 is a block diagram showing a configuration example of a mobile communication system according to the second exemplary embodiment of the present invention. The radio base station 130 includes a radio receiver 111, a radio transmitter 112, and a base station control station I/F unit 131. Further, the base station control station 140 includes a broadcast information generator 114, an RLC processor 115, a MAC processor 116, a pseudo incoming call controller 117, an RLC parameter adaptive controller 118, and a radio base station I/F unit 141.

The radio base station I/F unit 141 of the base station control station 140 passes data to the MAC processor 116 or receives data from the MAC processor 116, and performs communication of data with the radio base station 130.

The broadcast information generator 114, the RLC processor 115, the MAC processor 116, the pseudo incoming call controller 117, and the RLC parameter adaptive controller 118 of the base station control station 140 are similar to the components denoted by the same names and reference symbols in the first exemplary embodiment. Further, a communication unit 142 includes the MAC processor 116 and the radio base station I/F unit 141.

The base station control station I/F unit 131 of the radio base station 130 performs data communication with the base station control station 140, transmits data to the radio transmitter 112, and receives data from the radio receiver 111.

The radio transmitter 112 of the radio base station 130 transmits the transmission data received from the base station control station I/F unit 131 to the mobile terminal 120.

The radio receiver 111 of the radio base station 130 passes the reception data to the base station control station I/F unit 131 to the mobile terminal 120.

The radio receiver 121 of the mobile terminal 120 passes the data received from the radio base station 130 to the MAC processor 123.

The radio transmitter 122 of the mobile terminal 120 transmits the data received from the MAC processor 123 to the radio base station 130.

The MAC processor 123, the RLC processor 124, and the broadcast information receiver 125 of the mobile terminal 120 are similar to the components denoted by the same names and reference symbols as those in the first exemplary embodiment.

In this way, according to the second exemplary embodiment, the radio base station 130 and the base station control station 140 are formed to be separated from each other. Accordingly, such an effect can be achieved that the present invention can be applied also to the mobile communication system in which the control apparatus includes a radio base station and a base station control station.

Other Exemplary Embodiments

Each exemplary embodiment has been described taking an example in which the RLC maximum retransmission number and the response wait timer value are used as the RLC parameters, other parameter values may be set.

For example, the present invention may also be applied to a case in which parameter values disclosed in 9.5 Timers, 9.6 Protocol Parameters of 3GPP TS25.322 Radio Link Control (RLC) protocol specification (http://www.3gpp.org/ftp/Specs/archive/25_series/ 25.322/25322-860.zip) are set. Shown below is one example of specific parameters.

9.5 Timers
  a) Timer_Poll.
  b) Timer_Poll_Prohibit.
  d) Timer_Discard.
  e) Timer_Poll_Periodic.
  f) Timer_Status_Prohibit.
  g) Timer_Status_Periodic.
  h) Timer_RST.
  i) Timer_MR W.
  j) Timer_OSD.
  k) Timer_DAR.
9.6 Protocol Parameters
  a) MaxDAT.
  b) Poll_PDU.
  c) Poll_SDU.
  d) Poll_Window.
  e) MaxRST.
  f) Configured_Tx_Window_Size.
  g) Configured_Rx_Window_Size.
  h) MaxMR W.
  i) OSD_Window_Size.
  j) DAR_Window_Size.

Further, the timing at which the control apparatus (radio base station, base station control station) executes the parameter control processing is not limited to the case in which the radio base station is installed. For example, the parameter control processing may be executed when the environment of the communication line changes. Further, the parameter control processing may be executed at any desired period of time (for example, periodically).

The control apparatus may be formed to have a function of executing the parameter control processing upon receiving an instruction from outside. For example, a manager of radio lines or a user who installs radio base stations transmits information including the start message (parameter control processing instruction information) to the control apparatus. The control apparatus may receive parameter control processing instruction information to start the parameter control processing.

Further, the parameter control processing achieved by the control apparatus may be achieved by a program for causing a computer to execute each means. The program is loaded to a memory in a computer, and is executed under a control of a central processing unit (CPU).

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The program includes the following means: (1) a parameter control procedure for setting a parameter; (2) a broadcast information generation procedure for generating broadcast information including the parameter; (3) a pseudo incoming call control procedure for performing pseudo incoming call to a communication terminal for a plurality of times after the broadcast information is broadcasted to the communication terminal through a communication unit, to measure a success rate of the pseudo incoming calls using responses to the pseudo incoming calls; and (4) a parameter update procedure for updating the parameter according to the success rate that is measured. Here, the parameter control procedure and the parameter update procedure correspond to the function of the RLC parameter adaptive controller 118 in FIGS. 1 and 6. The broadcast information generation procedure corresponds to the function of the broadcast information generator 114, and the pseudo incoming call control procedure corresponds to the function of the pseudo incoming call controller 117.

Now, a specific example of parameter control when the parameter control processing is started will be described.

Figure 5:
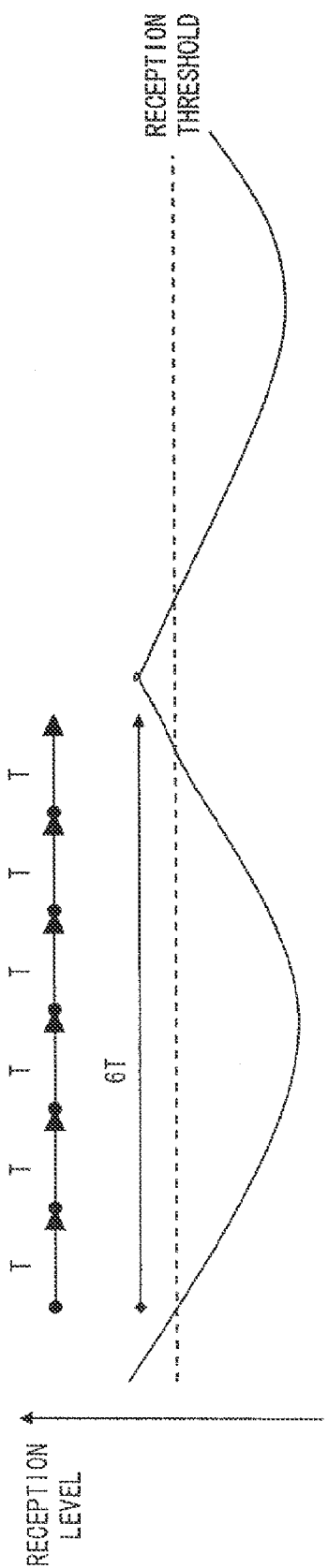
FIG. 5 is a diagram showing an operation example when there is a stationary wave of 6T cycle.

For example, when there is slow fading (stationary wave) of 6T cycle as shown in FIG. 5, the rate of the response success becomes high when the maximum retransmission number is equal to or larger than 6 in the RLC response wait timer T. In such a case, the radio base station, e.g., the femto base station performs pseudo incoming call on the terminal which camps on to measure the success rate, thereby being able to obtain the optimal RLC maximum retransmission number of 6.

Figure 6:
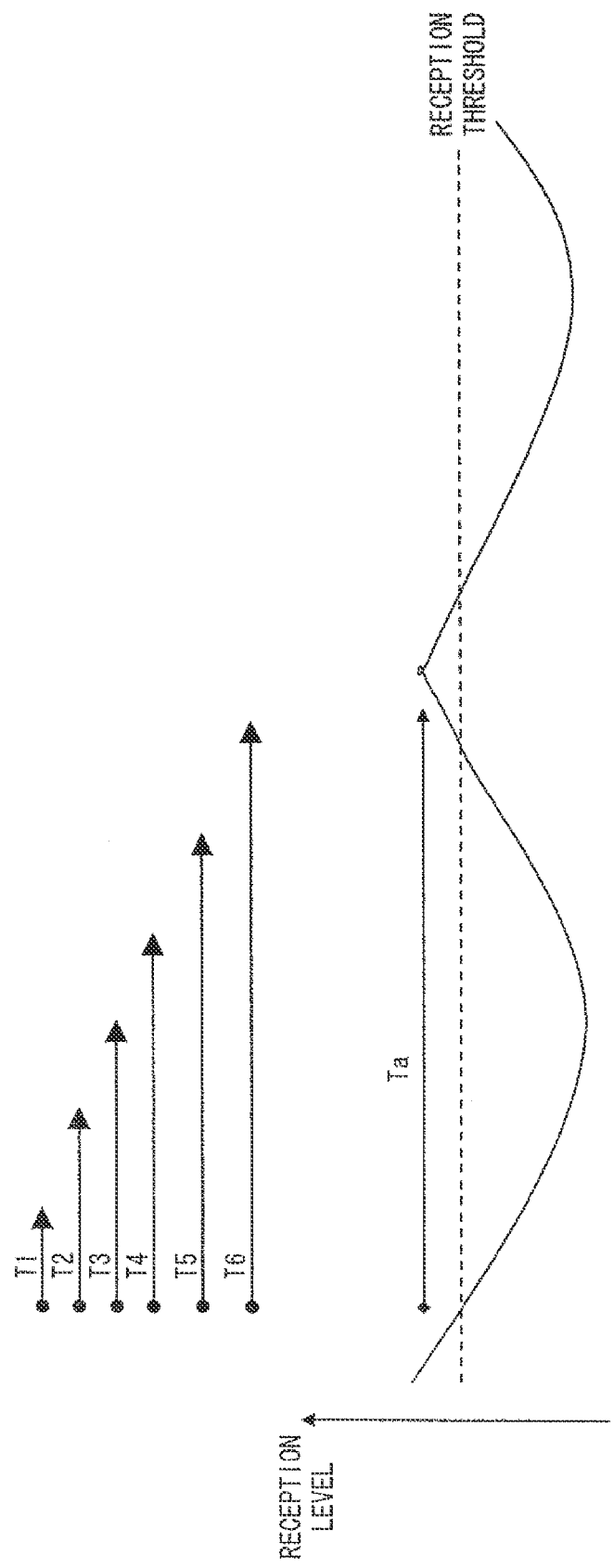
FIG. 6 is a diagram showing an operation example when there is a stationary wave of Ta cycle.
Figure 7:
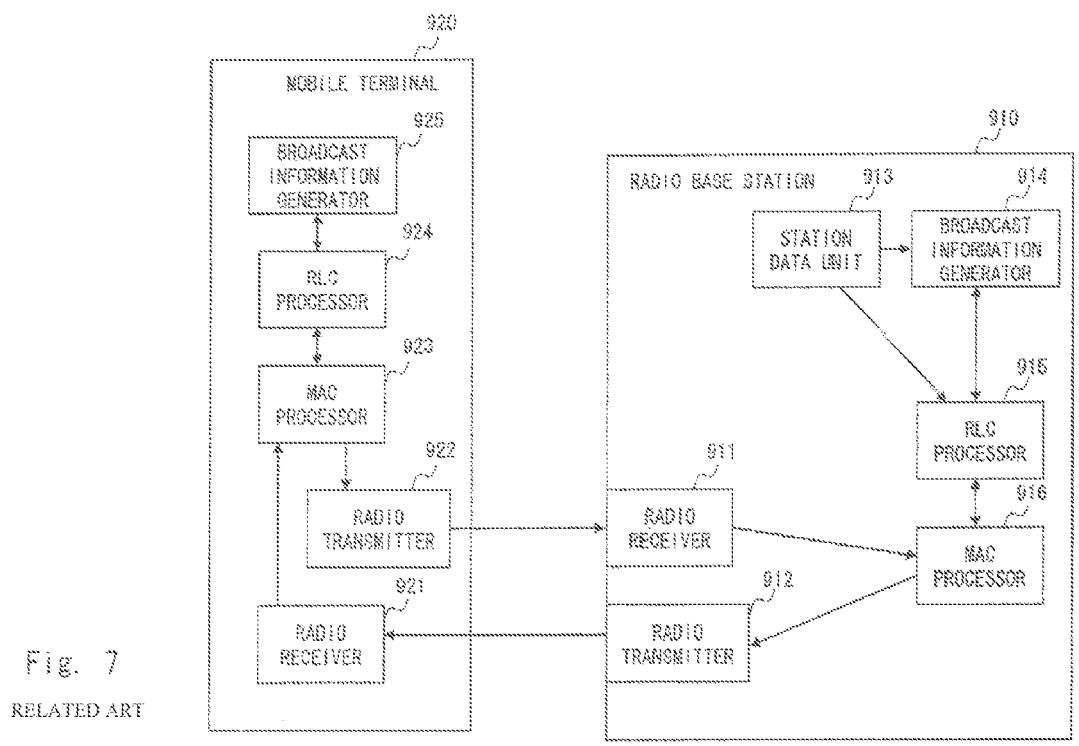
FIG. 7 is a block diagram showing a configuration example of a related mobile communication system.

Further, when there is fading (stationary wave) of Ta cycle as shown in FIG. 6, for example, the rate of the response success in which the RLC response wait timer T is larger than T6 becomes high. In such a case, the radio base station performs pseudo incoming call on the terminal which camps on, to obtain the optimal RLC response timer value of T6.

In FIGS. 5 and 6, when the mobile communication system includes the control apparatus as shown in FIG. 2, the base station control station 140 executes the pseudo incoming call through the radio base station 130.

As described above, each of the exemplary embodiments is able to provide means for automatically executing the RLC parameter changes and the incoming call test without human intervention when the radio base stations are installed to determine the RLC parameter with high success rate.

While the present invention has been described with reference to the exemplary embodiments, the present invention is not limited to the above description. Various changes that can be understood by a person skilled in the art may be made within the scope of the present invention to the configuration and the details of the present invention.

This application claims the benefit of priority, and incorporates herein by reference in its entirety, the following Japanese Patent Application No. 2010-011857 filed on Jan. 22, 2010.

While a part or all of the exemplary embodiments stated above may be described as stated below in Supplementary Notes, it is not limited to them.

(Supplementary Note 1) A control apparatus for controlling radio communication, comprising:
a communication unit for transferring data;
a radio link control unit that performs radio link control;
a parameter control unit that sets a parameter to be used for the radio link control;
a broadcast information generation unit that generates broadcast information including the parameter; and
a pseudo incoming call control unit that performs pseudo incoming call to a communication terminal for a plurality of times after the broadcast information is broadcasted to the communication terminal through the communication unit, to measure a success rate of the pseudo incoming calls using responses to the pseudo incoming calls,
wherein the parameter control unit updates the parameter according to the success rate measured by the pseudo incoming call control unit.

(Supplementary Note 2) The control apparatus according to Supplementary Note 1, wherein the pseudo incoming call control unit changes the setting of the parameter to perform the pseudo incoming call for a plurality of times, to measure a success rate of pseudo incoming calls at different parameters.

(Supplementary Note 3) The control apparatus according to Supplementary Note 2 or 3, wherein the parameter comprises at least one of a response timer value and a maximum retransmission number used for the radio link control.

(Supplementary Note 4) The control apparatus according to Supplementary Note 3, wherein
the parameter control unit sets the maximum retransmission number, and instructs the pseudo incoming call control unit to measure the success rate,
the pseudo incoming call control unit performs the pseudo incoming call for any desired number of times, and then measures the success rate, and
the parameter control unit determines the maximum retransmission number according to the success rate.

(Supplementary Note 5) The control apparatus according to Supplementary Note 3 or 4, wherein
the parameter control unit sets the response timer value, and instructs the pseudo incoming call control unit to measure the success rate,
the pseudo incoming call control unit performs the pseudo incoming call for any desired number of times, and then measures the success rate, and
the parameter control unit determines the response timer value according to the success rate.

(Supplementary Note 6) The control apparatus according to any one of Supplementary Notes 1 to 5, wherein the pseudo incoming call control unit is started when the communication terminal exists in a control area of the control apparatus when setting of the parameter is required.

(Supplementary Note 7) The control apparatus according to any one of Supplementary Notes 1 to 6, wherein the control apparatus comprises one of a radio base station for controlling radio communication and a base station control station for controlling the radio base station.

(Supplementary Note 8) A mobile communication system in which a control apparatus controls radio communication of a communication terminal, wherein
the control apparatus comprises:
a communication unit for transferring data;
a radio link control unit that performs radio link control;
a parameter control unit that sets a parameter to be used for the radio link control;
a broadcast information generation unit that generates broadcast information including the parameter;
a pseudo incoming call control unit that performs pseudo incoming call to a communication terminal for a plurality of times after the broadcast information is broadcasted to the communication terminal through the communication unit, to measure a success rate of the pseudo incoming calls using responses to the pseudo incoming calls, and
the parameter control unit updates the parameter according to the success rate measured by the pseudo incoming call control unit, and
the communication terminal comprises:
a broadcast information receiver for updating a parameter value in the communication terminal using the parameter included in the broadcast information;
a terminal radio receiver for receiving the pseudo incoming call; and
a terminal radio transmitter for transmitting responses to the pseudo incoming calls.

(Supplementary Note 9) A method of controlling radio communication for setting a parameter to be used for radio link control by a control apparatus of a mobile communication system, the method comprising:
setting the parameter;
generating broadcast information including the parameter;
broadcasting the broadcast information to a communication terminal through communication unit;

performing pseudo incoming call to the communication terminal for a plurality of times;

measuring a success rate of the pseudo incoming calls according to responses from the communication terminal; and updating the parameter according to the success rate that is measured.

(Supplementary Note 10) A non-transitory computer readable medium storing a program for achieving a radio communication control method of setting a parameter to be used for radio link control by a control apparatus of a mobile communication system, the non-transitory computer readable medium causing a computer to execute:

a parameter control procedure for setting the parameter;

a broadcast information generation procedure for generating broadcast information including the parameter;

a pseudo incoming call control procedure for performing pseudo incoming call to a communication terminal for a plurality of times after the broadcast information is broadcasted to the communication terminal through the communication unit, to measure a success rate of the pseudo incoming calls using responses to the pseudo incoming calls; and a parameter update procedure for updating the parameter according to the success rate that is measured.

(Supplementary Note 11) The control apparatus according to any one of Supplementary Notes 1 to 7, wherein the parameter control unit selects a value of a parameter when the success rate is maximum.

REFERENCE SIGNS LIST 110, 130 RADIO BASE STATION
111, 121 RADIO RECEIVER
112, 122 RADIO TRANSMITTER
114 BROADCAST INFORMATION GENERATOR
115, 124 RLC PROCESSOR (RADIO LINK CONTROLLER)
116 MAC PROCESSOR
117 PSEUDO INCOMING CALL CONTROLLER
118 RLC PARAMETER ADAPTIVE CONTROLLER (PARAMETER CONTROLLER)
119, 142 COMMUNICATION UNIT
120 MOBILE TERMINAL
123 MAC PROCESSOR
125 BROADCAST INFORMATION RECEIVER
131 BASE STATION CONTROL STATION I/F UNIT
140 BASE STATION CONTROL STATION
141 RADIO BASE STATION I/F UNIT

The invention claimed is:

1. A control apparatus for controlling radio communication, comprising:

a communication unit that transfers data;
a radio link control unit that performs radio link control;
a parameter control unit that sets a parameter to be used for the radio link control;
a broadcast information generation unit that generates broadcast information including the parameter set by the parameter control unit; and
a pseudo incoming call control unit that performs pseudo incoming call to a communication terminal for a plurality of times after the broadcast information is broadcasted to the communication terminal through the communication unit, to measure a success rate of the pseudo incoming calls using responses to the pseudo incoming calls, wherein the parameter control unit updates the parameter according to the success rate measured by the pseudo incoming call control unit, wherein the parameter control unit changes the parameter, the broadcast information generation unit generates broadcast information including the parameter changed by the parameter control unit, the pseudo incoming call control unit performs the pseudo incoming call for a plurality of times after the broadcast information including the changed parameter is broadcasted by the parameter control unit through the communication unit, and measures a success rate of pseudo incoming calls at different parameters, and wherein the parameter comprises at least one of a response timer value and a maximum retransmission number used for the radio link control.

2. The control apparatus according to claim 1, wherein
the parameter control unit sets the maximum retransmission number, and instructs the pseudo incoming call control unit to measure the success rate,
the pseudo incoming call control unit performs the pseudo incoming call for any desired number of times, and then measures the success rate, and
the parameter control unit determines the maximum retransmission number according to the success rate.

3. The control apparatus according to claim 2, wherein
the parameter control unit sets the response timer value, and instructs the pseudo incoming call control unit to measure the success rate,
the pseudo incoming call control unit performs the pseudo incoming call for any desired number of times, and then measures the success rate, and
the parameter control unit determines the response timer value according to the success rate.

4. The control apparatus according to claim 1, wherein
the parameter control unit sets the response timer value, and instructs the pseudo incoming call control unit to measure the success rate,
the pseudo incoming call control unit performs the pseudo incoming call for any desired number of times, and then measures the success rate, and
the parameter control unit determines the response timer value according to the success rate.

5. The control apparatus according to claim 1, wherein the pseudo incoming call control unit is started when the communication terminal exists in a control area of the control apparatus and when setting of the parameter is required.

6. The control apparatus according to claim 1, wherein the control apparatus comprises one of a radio base station for controlling radio communication and a base station control station for controlling the radio base station.

7. The control apparatus according to claim 1, wherein the pseudo incoming call control unit is started when the communication terminal exists in a control area of the control apparatus and when setting of the parameter is required.

8. The control apparatus according to claim 1, wherein the control apparatus comprises one of a radio base station for controlling radio communication and a base station control station for controlling the radio base station.

9. The control apparatus according to claim 1, wherein the parameter control unit selects a value of a parameter when the success rate is maximum.

10. A mobile communication system in which a control apparatus controls radio communication of a communication terminal, wherein the control apparatus comprises:
- a communication unit that transfers data;
- a radio link control unit that performs radio link control;
- a parameter control unit that sets a parameter to be used for the radio link control;
- a broadcast information generation unit that generates broadcast information including the parameter set by the parameter control unit;
- a pseudo incoming call control unit that performs pseudo incoming call to a communication terminal for a plurality of times after the broadcast information is broadcasted to the communication terminal through the communication unit, to measure a success rate of the pseudo incoming calls using responses to the pseudo incoming calls, and the parameter control unit updates the parameter according to the success rate measured by the pseudo incoming call control unit, and the communication terminal comprises:
- a broadcast information receiver that updates a parameter value in the communication terminal using the parameter included in the broadcast information;
- a terminal radio receiver that receives the pseudo incoming calls; and
- a terminal radio transmitter that transmits responses to the pseudo incoming calls, wherein the parameter control unit changes the parameter,
the broadcast information generation unit generates broadcast information including the parameter changed by the parameter control unit,
the pseudo incoming call control unit performs the pseudo incoming call for a plurality of times after the broadcast information including the changed parameter is broadcasted by the parameter control unit through the communication unit, and measures a success rate of pseudo incoming calls at different parameters, and wherein the parameter comprises at least one of a response timer value and a maximum retransmission number used for the radio link control.

11. The mobile communication system according to claim 8, wherein the parameter control unit selects a value of a parameter when the success rate is maximum.

12. A method of controlling radio communication for setting a parameter to be used for radio link control by a control apparatus of a mobile communication system, the method comprising:
- setting, by a parameter control unit, the parameter;
- generating broadcast information including the parameter set by the parameter control unit;
- broadcasting the broadcast information to a communication terminal through a communication unit;
- performing pseudo incoming call to the communication terminal for a plurality of times;
- measuring a success rate of the pseudo incoming calls according to responses from the communication terminal;
- updating the parameter according to the success rate that is measured;
- changing the parameter;
- generating additional broadcast information including the changed parameter, and broadcasting the generated additional broadcast information;
- performing the pseudo incoming call for an additional plurality of times after the broadcast information which includes the changed parameter is broadcasted; and
- measuring a success rate of pseudo incoming calls at different parameters, wherein the parameter comprises at least one of a response timer value and a maximum retransmission number used for the radio link control.

* * * * *

UNITED STATES PATENT AND TRADEMARK OFFICE
CERTIFICATE OF CORRECTION

PATENT NO. : 8,750,861 B2  
APPLICATION NO. : 13/521583  
DATED : June 10, 2014  
INVENTOR(S) : Takayuki Kondo Page 1 of 1

It is certified that error appears in the above-identified patent and that said Letters Patent is hereby corrected as shown below:

Title Page, item (74), Column 2 (Attorney, Agent, or Firm), Line 1: Delete "Sugrue" and insert -- Sughrue --

In the Claims:

Column 16, Line 5-6: In Claim 11, delete "claim 8," and insert -- claim 10, --

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,750,861 B2  
APPLICATION NO. : 13/521583  
DATED : June 10, 2014  
INVENTOR(S) : Takayuki Kondo Page 1 of 1

It is certified that error appears in the above-identified patent and that said Letters Patent is hereby corrected as shown below:

Title Page, item (74), Column 2 (Attorney, Agent, or Firm), Line 1: Delete "Sugrue" and insert -- Sughrue --

In the Claims:

Column 16, Line 4-5, In Claim 11, delete "claim 8," and insert -- claim 10, --

This certificate supersedes the Certificate of Correction issued October 21, 2014.

Signed and Sealed this  
Eleventh Day of November, 2014

Michelle K. Lee  
*Deputy Director of the United States Patent and Trademark Office*